(12) United States Patent
Gritz et al.

(10) Patent No.: US 9,191,800 B2
(45) Date of Patent: Nov. 17, 2015

(54) METHODS AND APPARATUS FOR DEVICE DETECTION IN RESPONSE TO SIGNAL BROADCAST

(71) Applicant: Raytheon Company, Waltham, MA (US)

(72) Inventors: Michael A. Gritz, Santa Barbara, CA (US); Marc C. Bauer, Goleta, CA (US); Rafael Hernandez, Oxnard, CA (US)

(73) Assignee: Raytheon Company, Waltham, MA (US)

( * ) Notice: Subject to any disclaimer, the term of this patent is extended or adjusted under 35 U.S.C. 154(b) by 10 days.

(21) Appl. No.: 14/049,486

(22) Filed: Oct. 9, 2013

(65) Prior Publication Data
US 2014/0266758 A1    Sep. 18, 2014

Related U.S. Application Data

(60) Provisional application No. 61/778,996, filed on Mar. 13, 2013.

(51) Int. Cl.
| | | |
|---|---|---|
| G08B 21/00 | (2006.01) | |
| H04W 8/00 | (2009.01) | |
| F41H 11/136 | (2011.01) | |

(52) U.S. Cl.
CPC ............. *H04W 8/005* (2013.01); *F41H 11/136* (2013.01)

(58) Field of Classification Search
CPC ............................ H04W 8/005; F41H 11/136
USPC ............. 340/686.1, 686.6, 540, 572.1–572.9; 455/403, 404.1, 404.2, 575.5; 343/824, 343/700 R
See application file for complete search history.

(56) References Cited

U.S. PATENT DOCUMENTS

| | | | |
|---|---|---|---|
| 6,310,346 B1 | 10/2001 | Boreman et al. | |
| 6,459,084 B1 * | 10/2002 | Boreman et al. | 250/349 |
| 7,183,966 B1 * | 2/2007 | Schramek et al. | 342/53 |
| 7,679,057 B2 * | 3/2010 | Gritz et al. | 250/338.1 |
| 8,053,734 B2 | 11/2011 | Kirby et al. | |
| 8,275,572 B2 * | 9/2012 | Burns et al. | 702/158 |
| 2004/0198381 A1 * | 10/2004 | Siegel et al. | 455/456.1 |
| 2005/0064922 A1 * | 3/2005 | Owens et al. | 455/575.5 |
| 2007/0052580 A1 * | 3/2007 | Fiore | 342/133 |
| 2011/0050499 A1 * | 3/2011 | Jun et al. | 342/375 |

FOREIGN PATENT DOCUMENTS

EP    2 401 616 A1    6/2012

OTHER PUBLICATIONS

Notification of Transmittal of the International Search Report and the Written Opinion of the International Searching Authority, or the Declaration, PCT/US2014/016006, date of mailing Oct. 22, 2014, 4 pages.
Written Opinion of the International Searching Authority, PCT/US2014/016006, date of mailing Oct. 22, 2014, 5pages.

* cited by examiner

*Primary Examiner* — Kerri McNally
(74) *Attorney, Agent, or Firm* — Daly, Crowley, Mofford & Durkee, LLP

(57) ABSTRACT

Methods and apparatus for detecting a device, such as a cell phone, by transmitting signals in various formats and detecting a response from the device. In general, different devices respond to different signal formats. Upon detecting the device, an alert can be generated.

19 Claims, 8 Drawing Sheets

METHODS AND APPARATUS FOR DEVICE DETECTION IN RESPONSE TO SIGNAL BROADCAST

CROSS REFERENCE TO RELATED APPLICATION

The present application claims the benefit of U.S. Provisional Patent Application No. 61/778,996, filed on Mar. 13, 2013, which is incorporated herein by reference.

BACKGROUND

As is known in the art, cellular devices, such as mobile phones, can be used to activate other devices. For example, a landmine or other explosive device can be triggered by a mobile phone that is activated by a remote device, such as another mobile phone. The devastation resulting from such devices is well known.

SUMMARY

The present invention provides method and apparatus for detecting the presence of a wireless/rf device, such as a cell phone, that responds to signals broadcast in a variety of formats by a base station or a network access controller. For example, signals from multiple wireless network providers can be transmitted to elicit responses from cell phones in the area. With this arrangement, the base station can transmit signals in various formats to which cell phones generate a response that can be detected by an array. In one embodiment, an exemplary device detection system is useful for detecting a wireless device in an area in which such devices are not expected to be found. Such wireless devices can be associated with improvised electronic devices, for example. An alert can be generated upon the wireless device detection to enable a driver to stop a vehicle before approaching the detected device, for example. While exemplary embodiments of the invention are shown and described in conjunction with various applications, components, devices, and transmitters, it is understood that embodiments of the invention are applicable to systems in general in which detection of wireless devices is desirable.

In one aspect of the invention, a method comprises: transmitting a first signal in a first format, transmitting a second signal in a second format, detecting, using an array, a wireless device within a given range generating a signal in response to the first signal, and generating a detection signal upon detecting the device.

The method can further include one or more of the following features: the first signal format corresponds to a signal from a first wireless network provider, the device comprises a cell phone, the array comprises a focal plane array, transmitting the first signal from a vehicle, generating an alert when the device is detected, the array comprises a two-dimensional staring array, determining a distance from the array to the device, and/or tracking the device as the device moves.

In another aspect of the invention, a system comprises: an array to detect a device generating a signal in response to signals transmitted in a variety of formats by a base station, a detector module coupled to the array to generate an alert signal in response to detection of the device, and a controller coupled to the array.

The system can further include one or more of the following features: a base station to transmit a first signal in a first format and transmit a second signal in a second format, the device comprises a cell phone, the array comprises a focal plane array, a vehicle to support the array, the array comprises a two-dimensional staring array, the array is configured to determine a distance from the array to the device, and/or the array is configured to track the device as the device moves.

In a further aspect of the invention, a system comprises: an array means to detect a device generating a signal in response to signals transmitted in a variety of formats by a base station, a detector means coupled to the array means to generate an alert signal in response to detection of the device, and a controller coupled to the array means. The system can further include a vehicle to support the array means.

BRIEF DESCRIPTION OF THE DRAWINGS

The foregoing features of this invention, as well as the invention itself, may be more fully understood from the following description of the drawings in which.

DETAILED DESCRIPTION

Figure 1:
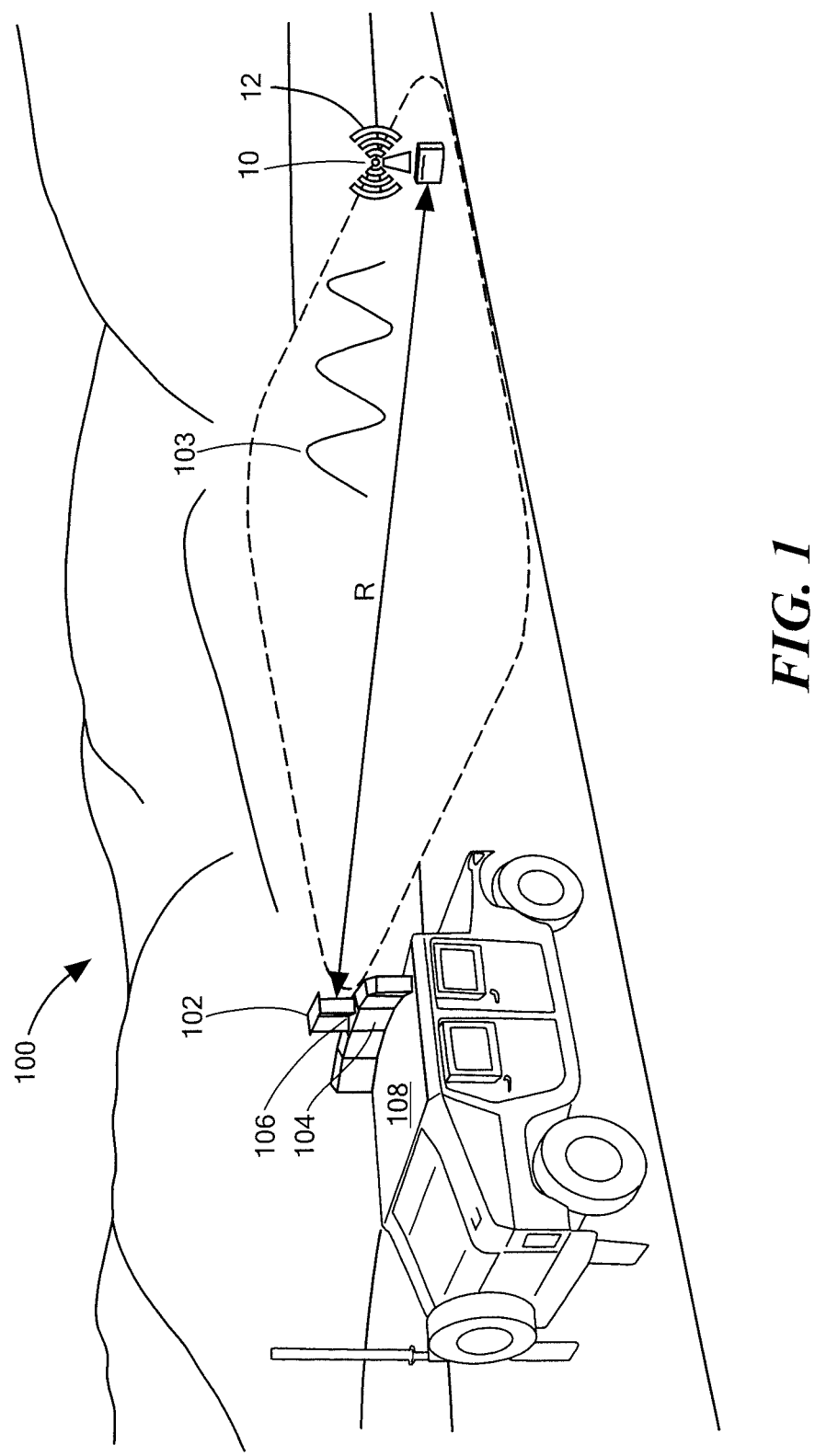
FIG. 1 is a schematic representation of a system for detecting devices in accordance with exemplary embodiments of the invention.

FIG. 1 shows an exemplary detection system 100 for detecting electronic devices within a given area. The system 100 includes a base station 102 to transmit signals 103 that can be received by electronic devices 10, such as cell phones, and a staring array 104 to detect emissions 12 from the electronic devices. An optional control module 106 interfaces with the base station. 102 and the array 104 to control overall system operation and coordinate operation of the base station 102 emissions and the detection array 104. It is understood that the base station and the array can be operated independently or in a coordinated manner. In an exemplary embodiment, the array 104 in can determine a range R of a detected device 10 to within about one meter.

In one embodiment, the system 100 includes a base station 102, a control module 106, and an array 104 mounted on a vehicle 108. The system 100 generates an alert upon detection of a device 10. With this arrangement, a moving vehicle 108 can come to a stop before entering the vicinity of the detected device. For example, a lead military convoy vehicle 108 can detect an electronic device 10 that may be part of an explosive device and can brake to a stop prior to entering an effective range of such a device.

It is understood that the base station 102 can be provided as any suitable network access controller that is effective to activate wireless devices. In, general, the network access controller broadcasts signals in a variety of formats, protocols, etc., to which a cell phone, for example, will respond. For example, a cell phone supported by a particular network 'listens' for signals from that network. Upon receiving a signal for that network, the cell phone responds in some way that generates a signal. In one embodiment, idle cellular devices within a coverage area, e.g., 300 meters, of the base station 102 home in to the base station signal. Once communications between the base station and the cellular device are established, the base station can prevent the device from communicating with other cellular devices. The array 104 then detects the signals generated by the cell phone 10.

Figure 2:
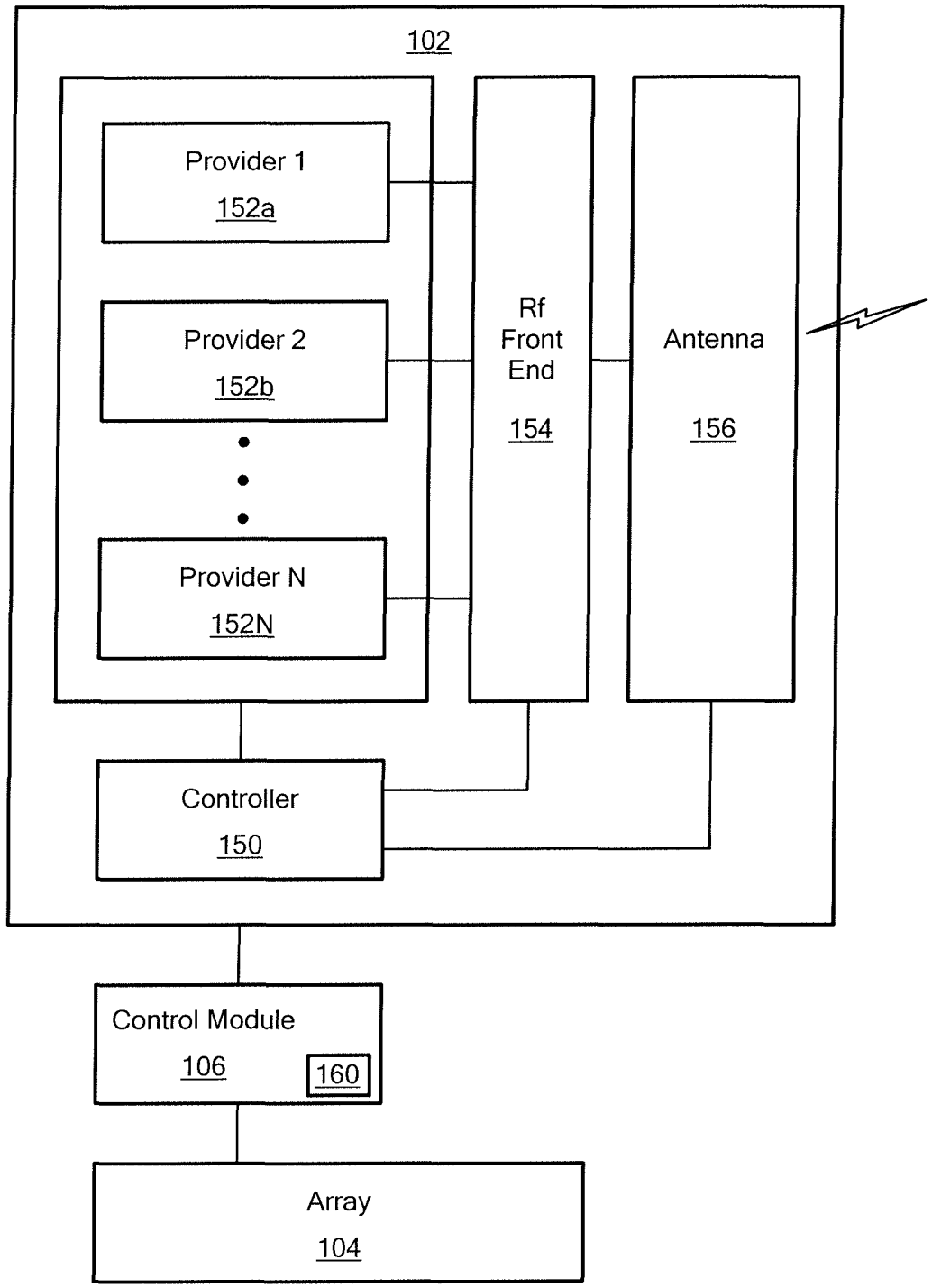
FIG. 2 is a block diagram showing further detail for components in the system of FIG. 1.

FIG. 2 shows a block diagram of an exemplary network access controller 102. A controller 150 is coupled to a series of provider modules 152a-N to support various wireless networks. For example, one purchasing a cell phone can select a particular wireless provider based on cost, number of minutes, coverage area, signal quality, etc. Each of these providers communicates to supported devices in a particular way. In general, a cellular phone can be used with a number of wireless network providers. A RE front end 154 is coupled to the wireless provider modules 152 to selectively transmit in accordance with a format for the wireless network. An antenna 156 coupled to the RF front end 154 transmits and receives signals over an air interface to and from devices.

In general, an alert generated by the system to indicate device detection can be provided in any desired format, such as audible alarms, visual displays, display screen indicators, dashboard displays, and the like. In one embodiment, the control module 106 includes an alert module 160 to provide or more indicators of device detection, for example to enable a driver to stop a moving vehicle. In one particular embodiment, alert is coupled to a vehicle braking system to eliminate driver reaction time after alert generation.

Any suitable commercially available network access controller or mini-base station can be used for device detection. Suitable systems are available from Enterasys Networks and Tecore Networks.

In other embodiments, the base station can comprise any signal transmitter that can elicit a response from a particular device for detection by an array. Exemplary embodiments of the invention can activate any wireless device that has a feedback communication loop. Examples of devices having a feedback loop include cellular phones, smart phones, tablets, mini-computers, GPS navigators, and the like. These devices use an RE signal to remain in contact with a tower/station. A detector array, which is described more fully below, can locate these devices in the field of view of the detector array. A control module can ping for wireless devices in the area. In an exemplary embodiment, a switching network is set on a cycle to sweep for wireless devices.

Figure 3:
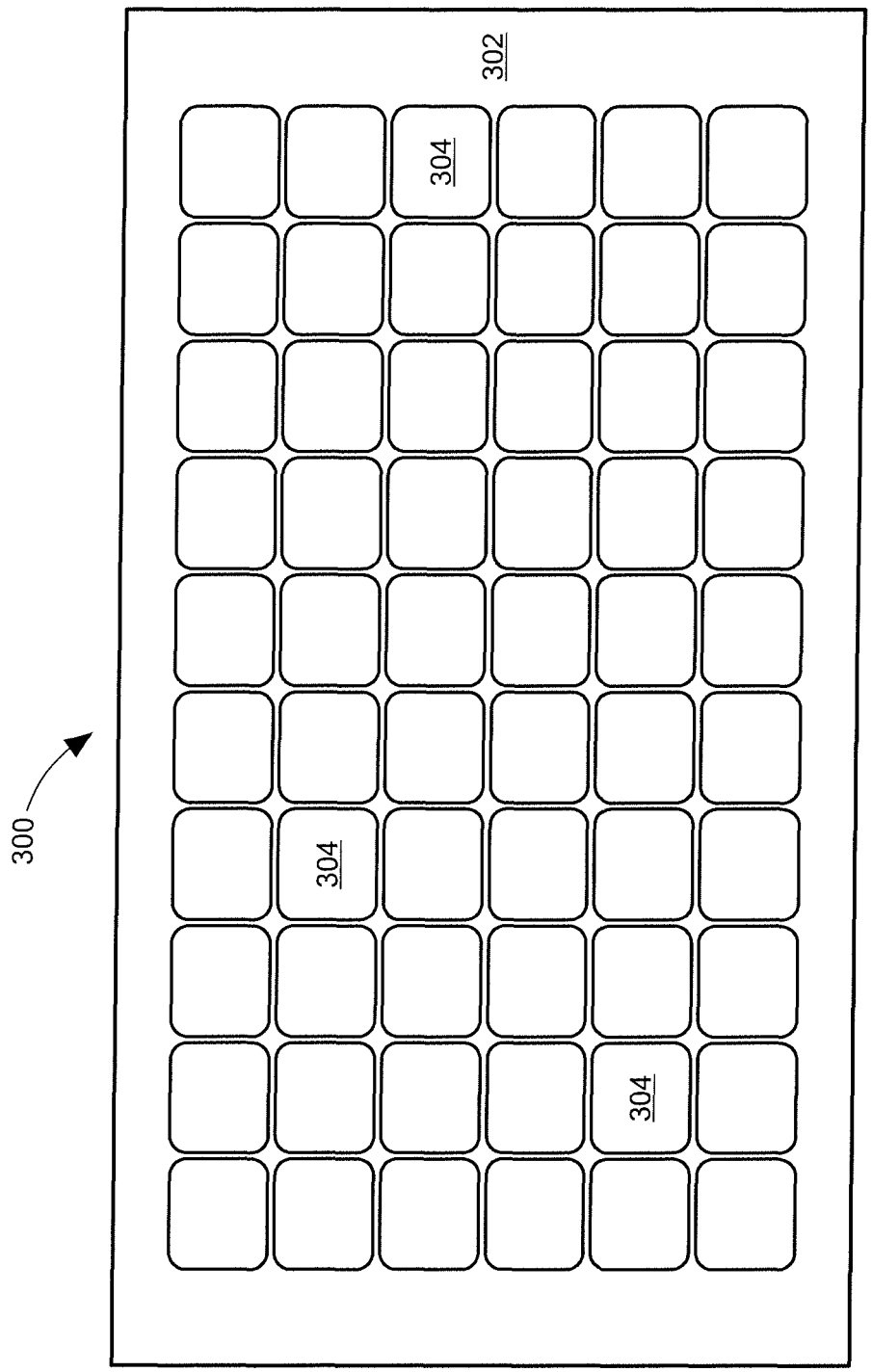
FIG. 3 is a schematic top view of an exemplary array that can detect signals from devices in accordance with exemplary embodiments of the invention.
Figure 3A:
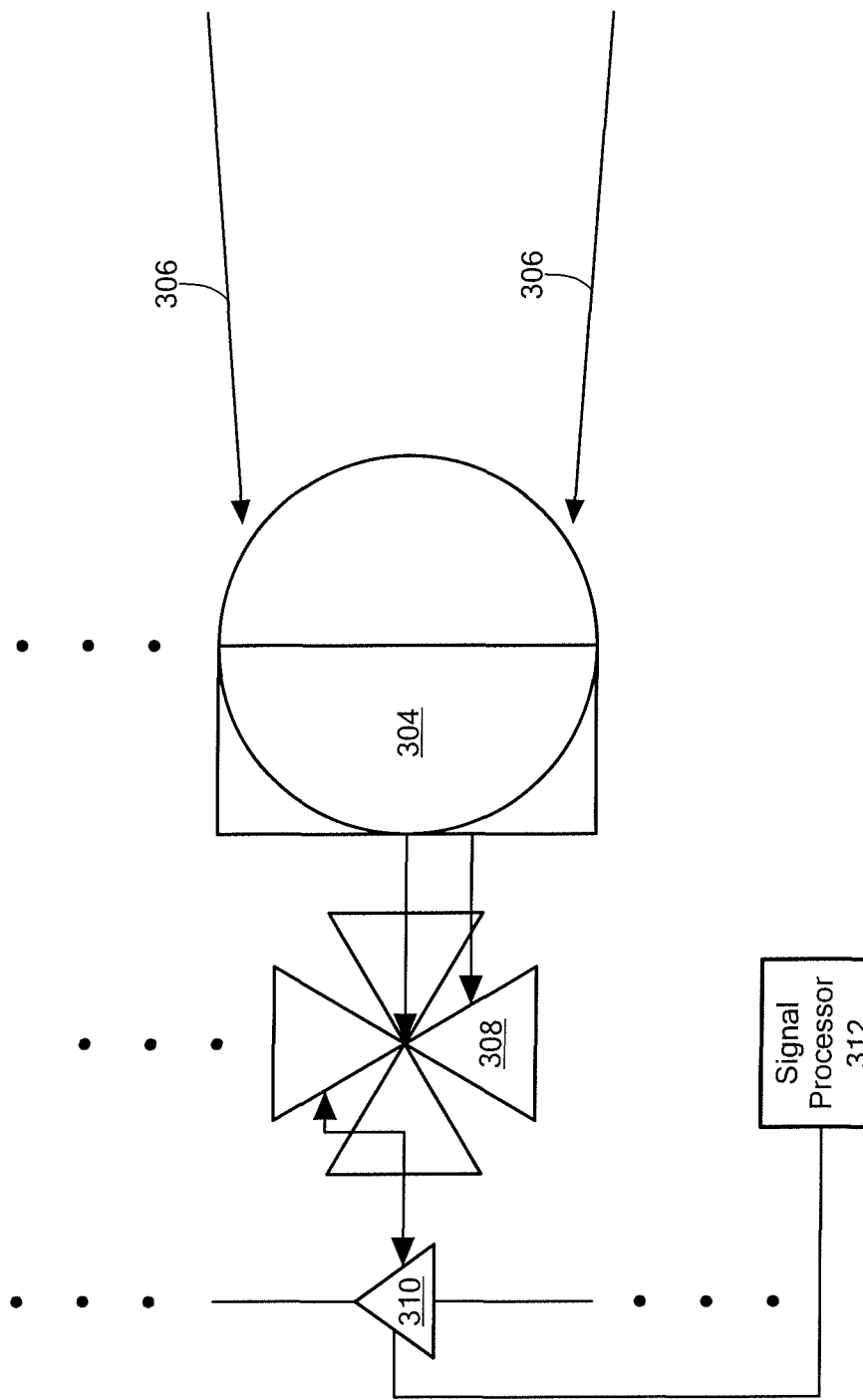
FIG. 3A is a schematic side view of the array of FIG. 3.

FIGS. 3 and 3A shows an exemplary array 300 that can be used as part of a device detection system in accordance with exemplary embodiments of the invention. FIG. 3 shows an exemplary array 300 of square lens elements comprising a two-dimensional 302 staring antenna coupled imaging array. The lens elements 304 can be provided as REXOLITE lenses. As is known in the art, a REXOLITE lens refers to cross-linked polystyrene microwave plastic lens used for high-frequency circuit substrates, microwave components, and lenses with acoustic, optical and radio-frequency applications. It is understood that other suitable lens elements can be used to meet the needs of a particular application.

In one embodiment, the array 300 includes a 10×10 matrix of elements 304 to detect signals to a range resolution of about 1 meter for a range of up to about 100 meters with an acquisition time of about 30 msecs. The array can have a 10 pW sensitivity, for example, operating in a bandwidth of about 0.2 to about 2 GHz.

FIG. 3A shows a side view of an antenna array element (lens) 304 receiving an RF cell phone signal 306. A dipole antenna 308 receives the output of the array element (lens) 304. A RF is diode detector 310 is coupled to the dipole antenna 308. A signal processor 312 can receive the signal from the detectors 310 in the array and process the information in a manner well known in the art. It is understood that a variety of suitable detectors can be used, U.S. Pat. No. 7,697,057 to Gritz et at, which is incorporated herein by reference, discloses an exemplary antenna-coupled sensor element.

In one embodiment, a vehicle includes a single array that can determine the range of a detected device. In other embodiments, multiple arrays can be used to determine the range and direction of a detected device.

Figure 4:
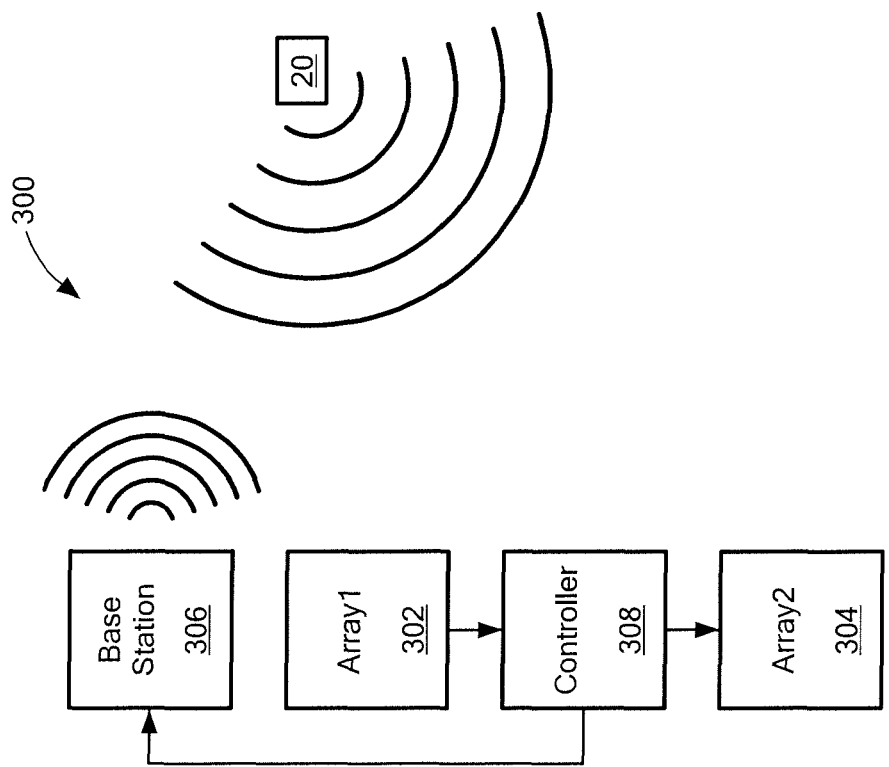
FIG. 4 is a schematic representation of an exemplary system with multiple arrays to enable direction finding for a detected device.

FIG. 4 shows an exemplary system 300 having first and second arrays 302, 204 to detect a signal from an electronic device 20. A base station 306 coupled to a controller 308 operates in conjunction with the arrays 302, 304 to determine a direction of a signal received from the device 20. In general, the arrays 302, 304 have a field of view (FOV) defined by the overlapping FOVs for two arrays in which device detection, and device direction, can be determined.

In an exemplary embodiment, a series of helicopters having device detection systems, or least an array, can survey an area. Low flying helicopters can follow a road or route prior to vehicle convoys to detect devices in the area for remediation. The system can be similarly implemented onto any moving platform.

Figure 5:
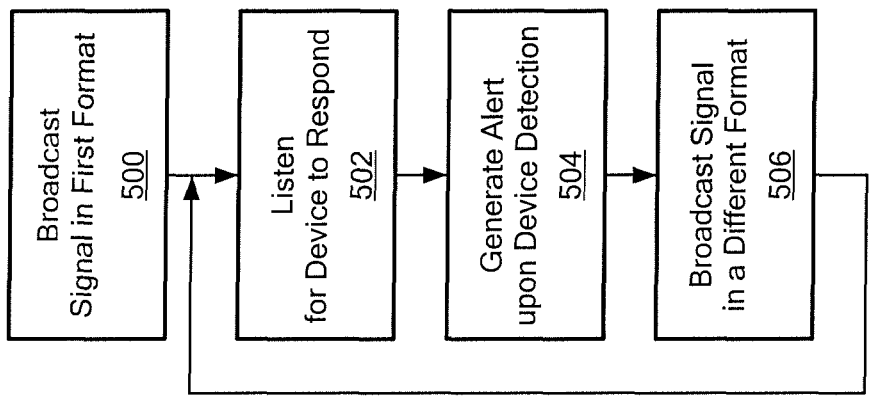
FIG. 5 is a flow diagram showing an exemplary sequence of steps for detecting a device in accordance with exemplary embodiments of the invention.

FIG. 5 shows an exemplary sequence of steps for providing device detection in accordance with exemplary embodiments of the invention. In step 500, a base station emits signals in a first format associated with a first wireless network provider, in step 502, the array 'listens' for any response from a device that responds to the signals from the first format signals broadcast by the base station. In step 504, a controller or other module generates an alert in the event a device is detected by the array. In response to the alert, for example, a driver of a vehicle can stop the vehicle before entering the vicinity of the device.

In step 506, the base station emits signals in a further format for a different provider and processing continues in step 502. The system can continues to broadcast different signal formats for different providers and listen for devices to respond. Upon detecting device responses, an alert can be generated.

Figure 6:
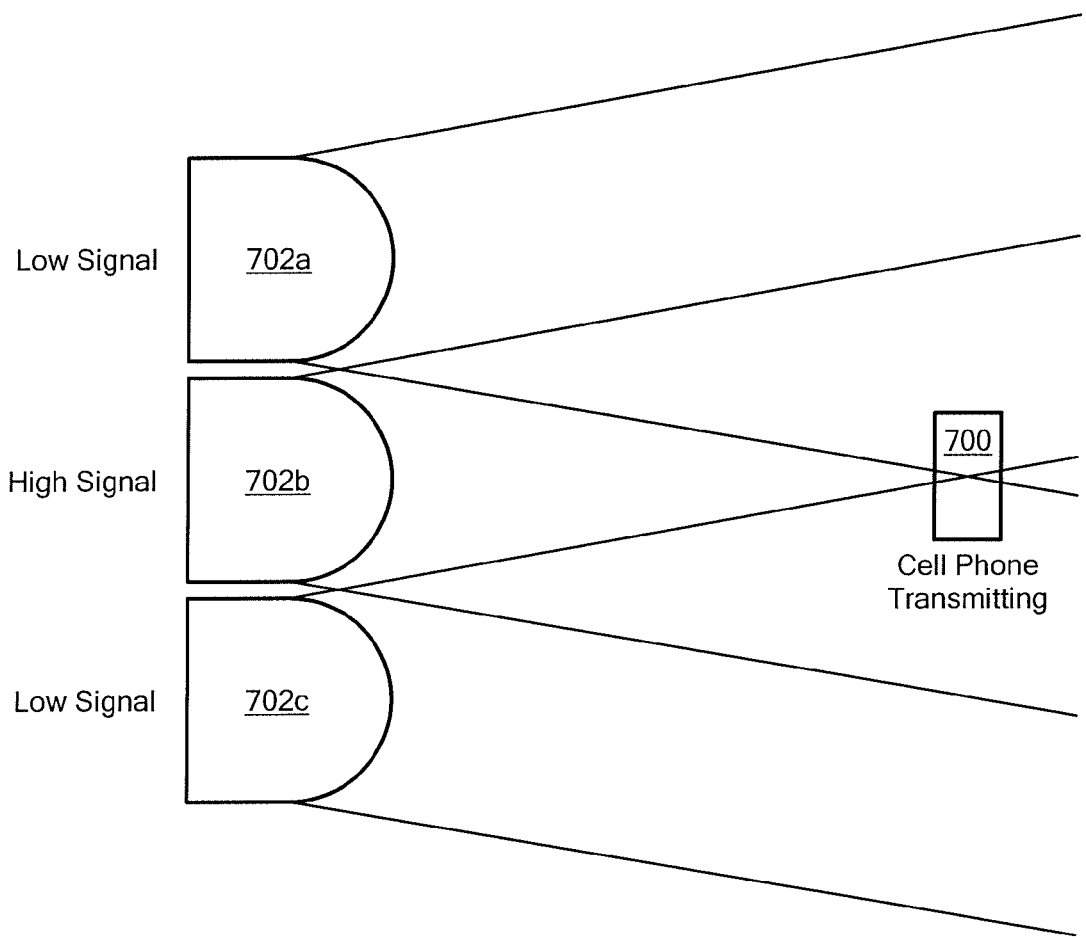
FIG. 6 is a schematic representation of an RF signal from a device impinging on array elements.
Figure 7:
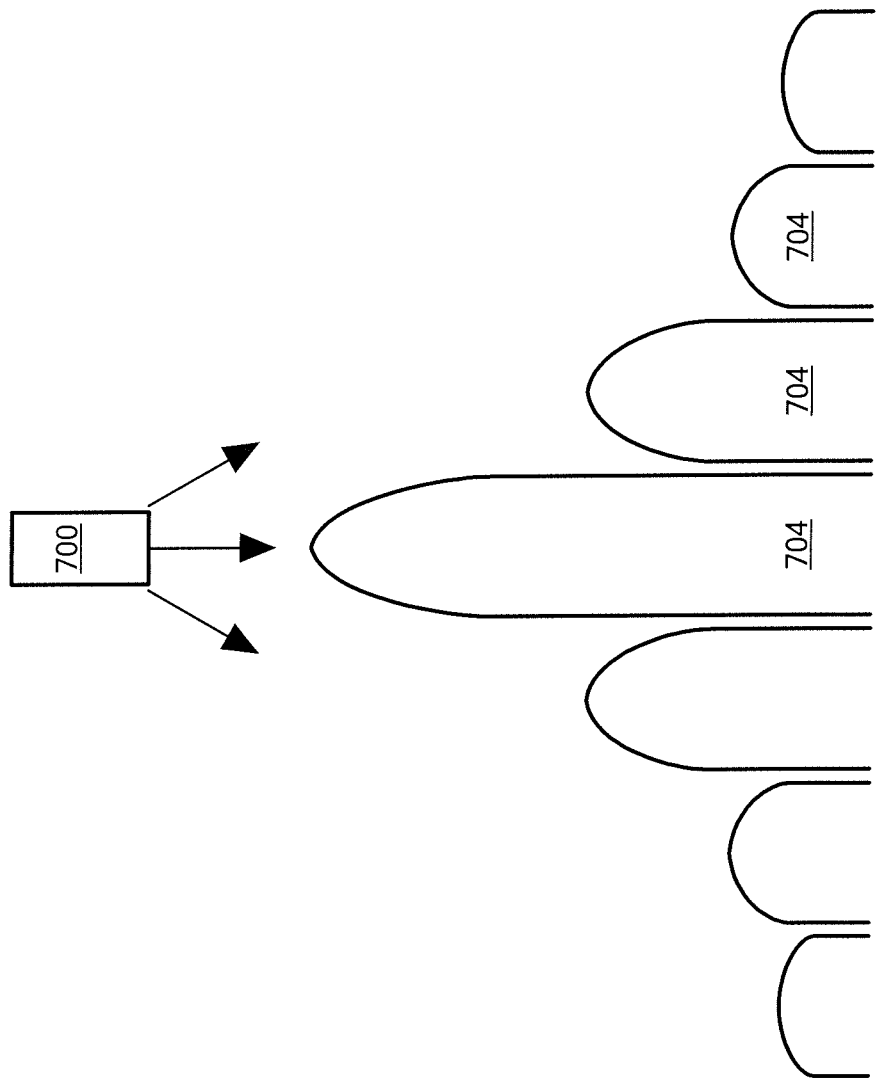
FIG. 7 is a schematic representation of array element amplitudes.

FIGS. 6 and 7 show an exemplary technique for detecting a device 700. Signal return from the device 700 is triangulated by measuring the amplitude between each element 702 in a two-dimensional array. After processing the amplitude 704 of each pixel of the array, a map, as shown in FIG. 7, can be generated enabling location to a resolution to about 1 meter, for example. The amplitude of each array element contributes to location detection in azimuth and elevation.

In one embodiment, a device detection system detects a device in an area in which no devices are expected to be found. For example, in an uninhabited desert area one would not expect to find cell phones since such devices are typically carried on person. Any device that is detected results in the generation of an alarm. In this arrangement, the presence of a significant number of devices would generate a corresponding number of devices if the devices respond to signals in the formats broadcast by the base station.

It is understood that the signal format refers to any characteristic of the signal that identifies a signal from a particular wireless network provider. Exemplary characteristics include signal characteristics, such as modulation type, frequency, phase, etc., and/or content characteristics, such as header information, preamble information, etc.

The detection on area/field of view is dependent on the size of the detector array. As the wireless devices move closer to the base station the resolution increases as does the ability to detect multiple devices. Tracking can occur after detection as long as it stays in range of the array and the base station.

In general, exemplary embodiments of the invention can be used to detect wireless/RF activity from moving vehicles. In other embodiments, a stationary system can be located in or proximate a structure, such as a movie theater, a stadium, or a theme park.

Figure 8:
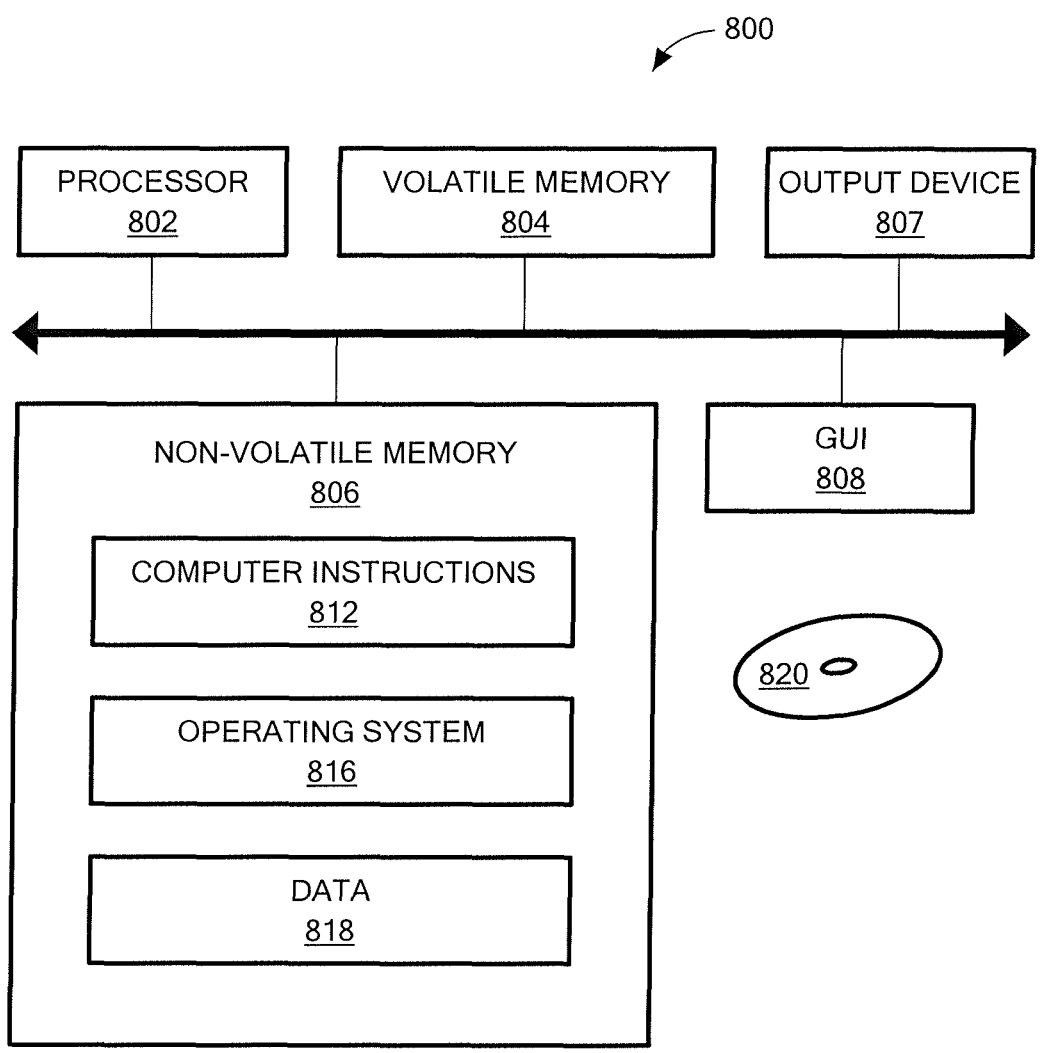
FIG. 8 is an exemplary computer that can perform at least some of the processing described herein.

FIG. 8 shows an exemplary computer 800 that can perform at least part of the processing described herein. The computer 800 includes a processor 802, a volatile memory 804, a non-volatile memory 806 (e.g., hard disk), an output device 807 and a graphical user interface (GUI) 808 (e.g., a mouse, a keyboard, a display, for example). The non-volatile memory 806 stores computer instructions 812, an operating system 816 and data 818. In one example, the computer instructions 812 are executed by the processor 802 out of volatile memory 804. In one embodiment, an article 820 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input, device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference lay their entirety.

What is claimed is:

1. A method, comprising:
transmitting a first signal in a first format;
transmitting a second signal in a second format;
detecting, using an array, a wireless device within a given range generating a signal in response to the first signal, wherein the array comprises a staring antenna-coupled imaging array having lens elements, which comprise plastic, and dipole antennas coupled to diode detectors, wherein the array is configured to detect the signal generated by the wireless device to range resolution of about one meter for a range of up to about 100 meters; and
generating a detection signal upon detecting the device.

2. The method according to claim 1, wherein the first signal format corresponds to a signal from a first wireless network provider.

3. The method according to claim 1, wherein the device comprises a cell phone.

4. The method according to claim 1, wherein the array comprises a focal plane array.

5. The method according to claim 1, further including transmitting the first signal from a vehicle.

6. The method according to claim 1, further including generating an alert when the device is detected.

7. The method according to claim 1, wherein the array comprises a two-dimensional staring array.

8. The method according to claim 1, further including determining a distance from the array to the device.

9. The method according to claim 1, further including tracking the device as the device moves.

10. A system, comprising:
an array to detect a device generating a signal in response to signals transmitted in a variety of formats by a base station;
a detector module coupled to the array to generate an alert signal in response to detection of the device, wherein the array comprises a staring antenna-coupled imaging array having lens elements, which comprise plastic, and dipole antennas coupled to diode detectors, wherein the array is configured to detect the signal generated by the wireless device to range resolution of about one meter for a range of up to about 100 meters; and
a controller coupled to the array.

11. The system according to claim 10, further including the base station, wherein the base station is configured to transmit a first signal in a first format and transmit a second signal in a second format.

12. The system according to claim 10, wherein the device comprises a cell phone.

13. The system according to claim 10, wherein the array comprises a focal plane array.

14. The system according to claim 10, further including a vehicle to support the array.

15. The system according to claim 10, wherein the array comprises a two-dimensional staring array.

16. The system according to claim 10, wherein the array is configured to determine a distance from the array to the device.

17. The system according to claim 10, wherein the array is configured to track the device as the device moves.

18. A system, comprising:
  an array means to detect a device generating a signal in response to signals transmitted in a variety of formats by a base station;
  a detector means coupled to the array means to generate an alert signal in response to detection of the device; and
  a controller coupled to the array means,
  wherein the array means comprises a staring antenna-coupled imaging array having lens elements, which comprise plastic, and dipole antennas coupled to diode detectors, wherein the array is configured to detect the signal generated by the wireless device to range resolution of about one meter for a range of up to about 100 meters.

19. The system according to claim 18, further including a vehicle to support the array means.

\* \* \* \* \*